Jan. 12, 1971  C. F. HULL  3,554,976
PREPARATION OF COPOLYESTERS
Filed July 24, 1968  2 Sheets-Sheet 1

INVENTOR
CHARLES F. HULL
BY
ATTORNEY

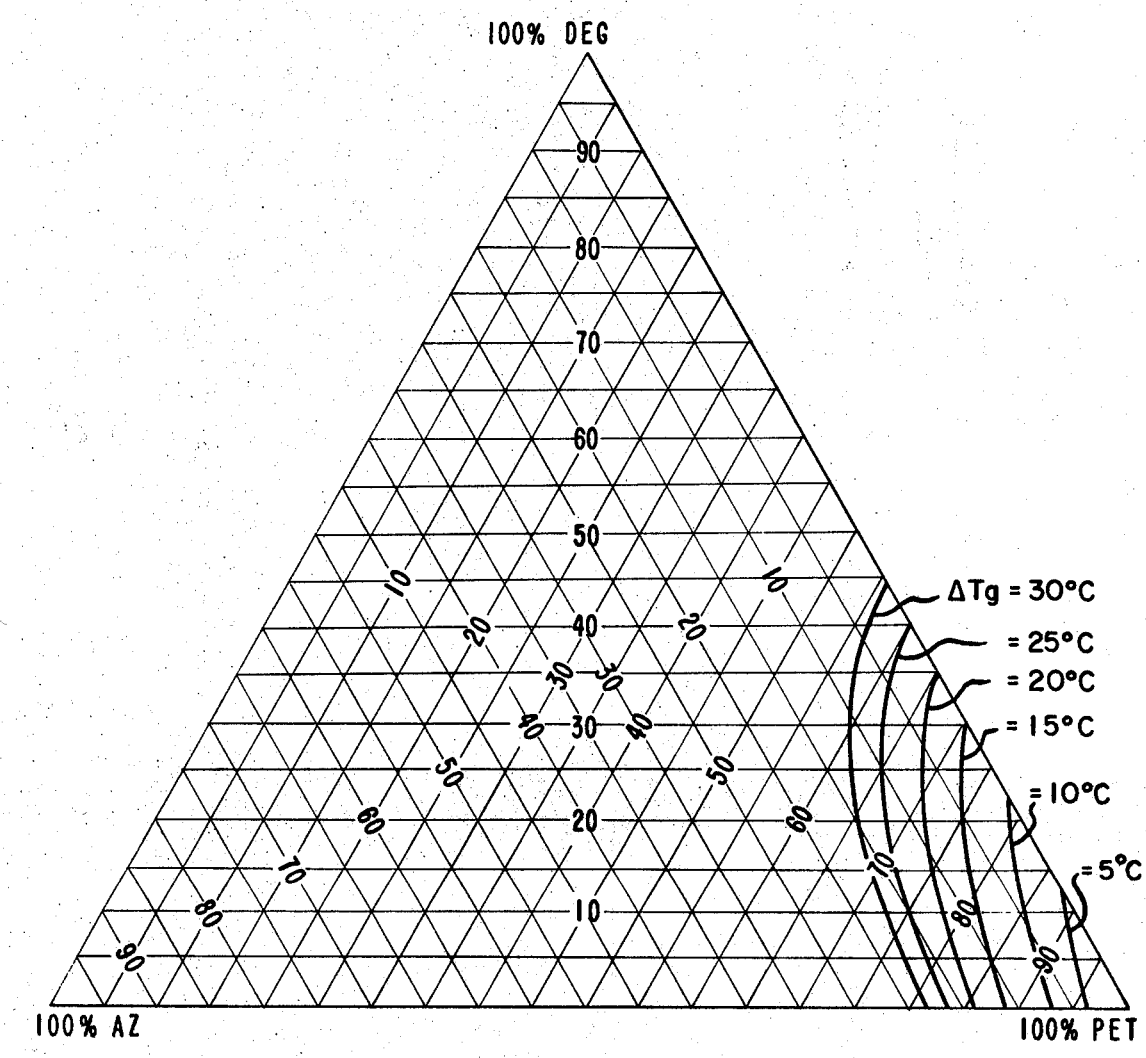

United States Patent Office 3,554,976
Patented Jan. 12, 1971

3,554,976
PREPARATION OF COPOLYESTERS
Charles F. Hull, Circleville, Ohio, assignor to E. I. du Pont de Nemours and Company, Wilmington, Del., a corporation of Delaware
Filed July 24, 1968, Ser. No. 747,356
Int. Cl. C08g 17/01
U.S. Cl. 260—75                                  4 Claims

ABSTRACT OF THE DISCLOSURE

Uniform composition in poly(ethylene terephthalate-azelate) is achieved by preforming dihydroxyethyl terephthalate, determining its concentration of diethylene glycol, and adding a quantity of preformed dihydroxyethyl azelate determined by reference to a ternary graph of glass transition temperature depression.

BACKGROUND OF THE INVENTION

Post-formable film structures enjoy widespread acceptance for vacuum packaging of certain foodstuffs and light hardware items wherein the film is drawn over the item to generally conform to its contours. The utility of a particular film for formable structures depends on its ability to form hermetic structures free from leaks or ruptures, its ability to conform to the contours of the packaged article and provide an attractive appearance, and its formability. Formability is closely related to the film property called the "F-80" value. This is the room temperature force required to elongate the film by 80% of its initial length. The F-80 value must necessarily be low, and it is generally preferred that it be less than 16,000 p.s.i.

Polyethylene terephthalate provides attractive base film for formable structures by virtue of the wide variation in physical properties that can be achieved by changes in the film process conditions and the composition of the base film. For example, reduction of the degree of orientation of the film generally reduces the F-80. Examination of the force-elongation relationship of polyethylene terephthalate film reveals that as the film is elongated at levels employed in stretch orienting, reinforcement occurs which results in a gradual increase in the force required to elongate farther. By limiting the stretch ratio in stretch-oriented films, the F-80 value can be kept relatively low. Unfortunately, however, gauge variation in the film is magnified by low stretch ratios, which can lead to undesirable film properties including variation in forming properties. The use of low stretch ratios in the orienting of the films is therefore generally not a satisfactory method for achieving low F-80 values.

Stretch orientation is done at or above the glass transition temperature. Therefore, polymers having lower glass transition temperatures generally have a higher degree of randomness, making it possible to get better formability, as indicated by lower F-80, combined with a good gauge uniformity by stretching to higher elongations at lower temperatures. At the same time, however, it is desirable to maintain the melting point of the resulting film at as high a temperature as possible, since this allows greater freedom in conditions for processing and use.

Attempts have accordingly been made to change the composition of the polyethylene terephthalate base film to adjust its F-80 characteristics by forming a copolymer. For example, it is known that diethylene glycol copolymer reduces the F-80 value, but the change effected is relatively insensitive to the quantity of diethylene glycol employed so that modification requires high concentrations which can have other undesirable effects on the film. Certain diacids, such as sebacic acid and azelaic acid have previously been used as a copolymer for polyethylene terephthalate, since diacids often give a desirable depression of the glass transition temperature combined with minimal melting point depression. However, methods heretofore employed for their incorporation have yielded a product which does not exhibit entirely satisfactory uniformity. These methods generally involve the formation of the monomers in situ. For example, in British Pat. 1,081,144, dimethyl esters of each of terephthalic and sebacic acids are used as starting materials, both of which continuously undergo an ester interchange reaction with ethylene glycol in the same reactor, and are thereafter continuously polymerized. The resulting product, however, is not of uniform composition, since varying amounts of each of the dihydroxyethyl monomers could be present at any given moment. This non-uniformity can be magnified in subsequent polymerization and film preparation. While the average ratio of the two components may be equivalent to the ratio of the starting materials charged into the reactor, the ratio at a particular portion of the product can vary significantly from the desired level, and the forming properties of the film will vary accordingly.

Further source of variation in product arises through variation in the amounts of diethylene glycol in the reaction mixture, since diethylene glycol is formed in the ester interchange reaction. The amount formed can depend, for example, on whether the ester starting material is virgin monomer or recycle, the reaction times for the various steps, as well as the pressure and temperature conditions prevailing at any instant in the ester interchange process.

The above method of combination was found necessary due to the physical characteristics of most of the comonomers which might be used for copolymerization with the polyethylene terephthalate. In the past the combined formation of the monomers was a more practicable alternative to the high temperatures or solvent systems that would be necessary, for example, for the addition of preformed dihydroxyethyl sebacate. The use of high temperatures for the addition of preformed monomer results in degradation and discoloration of the monomer, and, to some extent, additional diethylene glycol formation. The use of solvent systems for the addition of preformed monomer, on the other hand, necessitates an expenditure of power or a separate process step for the removal of these solvents for the completion of the reaction. Consequently, there has not been a process available heretofore for the preparation of polyethylene terephthalate copolymer films having both the uniformity of composition and the low F-80 values required for the use of such films as post-formable packaging materials.

SUMMARY OF THE INVENTION

Such a process, however, is supplied by the instant invention, which provides a process for the preparation of polyethylene terephthalate copolymer by condensation polymerization which comprises bringing into contact (a) a mixture comprising dihydroxyethyl terephthalate, and
(b) a quantity of separately preformed dihydroxyethyl azelate determined by reference to FIG. 3 to be sufficient to lower the glass transition temperature of the resulting copolyester by a given increment.

The poly(ethylene terephthalate-azelate) products resulting from this process are characterized by a unique consistency of composition.

BRIEF DESCRIPTION OF THE DRAWINGS

FIG. 3 is a ternary graph illustrating the mole percent concentrations of diethylene glycol units (DEG) and polyethylene azelate units (AZ) in a polyethylene terephthalate copolymer corresponding to various levels of depression of the glass transition temperature of polyethylene terephthalate (PET).

DESCRIPTION OF THE PREFERRED EMBODIMENTS

Figure 1:
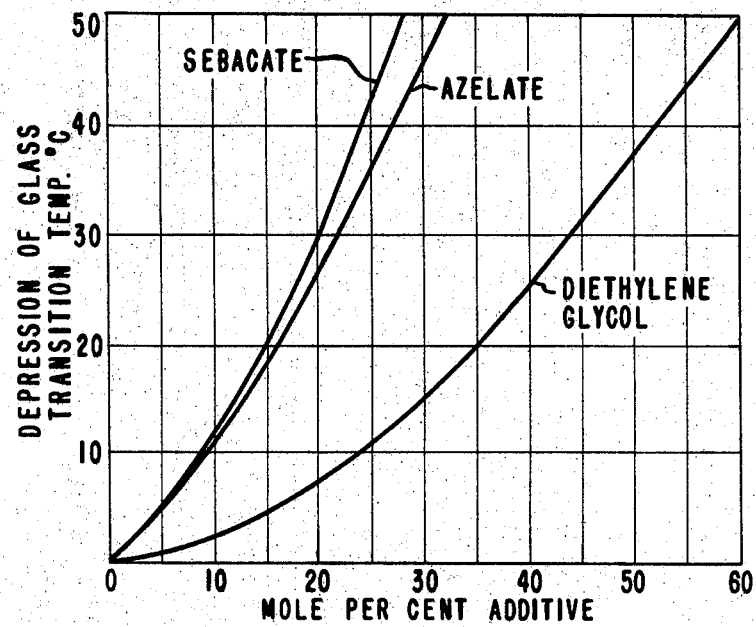
FIG. 1 graphically illustrates the depression of the glass transition temperature of polyethylene terephthalate as a function of the mole percent of various copolymers.

The instant invention is based on the discovery of the unique utility of dihydroxyethyl azelate in the preparation of polyethylene terephthalate copolyesters which are useful in the formation of films having low F–80 values. This particular azelate imparts a depression of F–80 values favorably comparable to other commonly used copolymers such as diethylene glycol or sebacic acid, as indicated by the comparsion of glass transition temperatures in FIG. 1. Further, the melting point of this dihydroxyethyl azelate is about from 19° to 20° C. which facilitates its addition as a preformed liquid at room temperature. Dihydroxyethyl azelate is also stable at room temperature and consequently can be preformed long prior to combination with the dihydroxyethyl terephthalate, and shipped or stored for any period desired.

In the process of the instant invention, the dihydroxyethyl terephthalate and the dihydroxyethyl azelate are copolymerized by conventional condensation polymerization techniques as illustrated, for example, in Whinfield and Dickson, U.S. Pat. 2,465,319, which is hereby incorporated by reference. The polymerization is generally carried out at elevated temperatures, for example, about from 220° to 300° C. to increase the speed of the reaction. The reaction is also usually carried out under reduced pressure to facilitate the removal of the ethylene glycol formed in the condensation.

The quantity of dihydroxyethyl azelate used as a copolymer in the reaction will vary according to the physical characteristics desired in the finished film, for example, the degree to which the glass transition temperature is to be depressed to obtain a desired F–80 value. In the absence of any diethylene glycol, this can be determined from FIG. 1, which illustrates the depression of glass transition temperature of the completed copolymer as a function of the mole percent of azelate copolymer. In practice, the dihydroxyethyl terephthalate mixture further comprises varying amounts of diethylene glycol species including diethylene glycol esters of terephthalic acid since diethylene glycol is a reaction product of the ester interchange reaction generally used in the formation of the dihydroxyethyl terephthalate. The quantities of diethylene glycol species present can be determined by saponification of the polymer and passage of the resulting mixture of ethylene glycol and diethylene glycol through a gas chromatographic column to separate and measure the quantity of each component. These quantities usually vary between 0.5 and 45 mole percent of the dihydroxyethyl terephthalate mixture. From these data the ternary diagram of FIG. 3 is useful for determining the quantity of azelate to be added to provide the desired depression of the glass transition temperature, $\Delta T_g$. The curves shown illustrate the depression in glass transition temperature as a function of the mole percentage of diethylene glycol and dihydroxyethyl azelate copolymer. Generally, about from 1 to 25 mole percent of diethylene glycol will be present.

Figure 2:
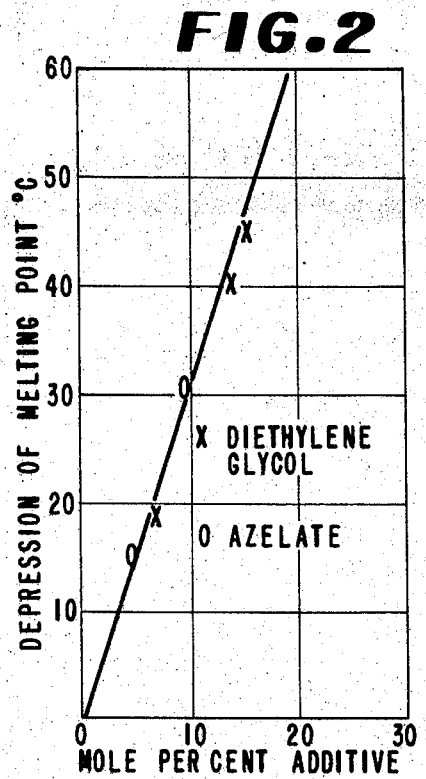
FIG. 2 illustrates the depression of the melting point of polyethylene terephthalate as a function of the mole percent of diethylene glycol or dihydroxyethyl azelate copolymer.
Figure 4:
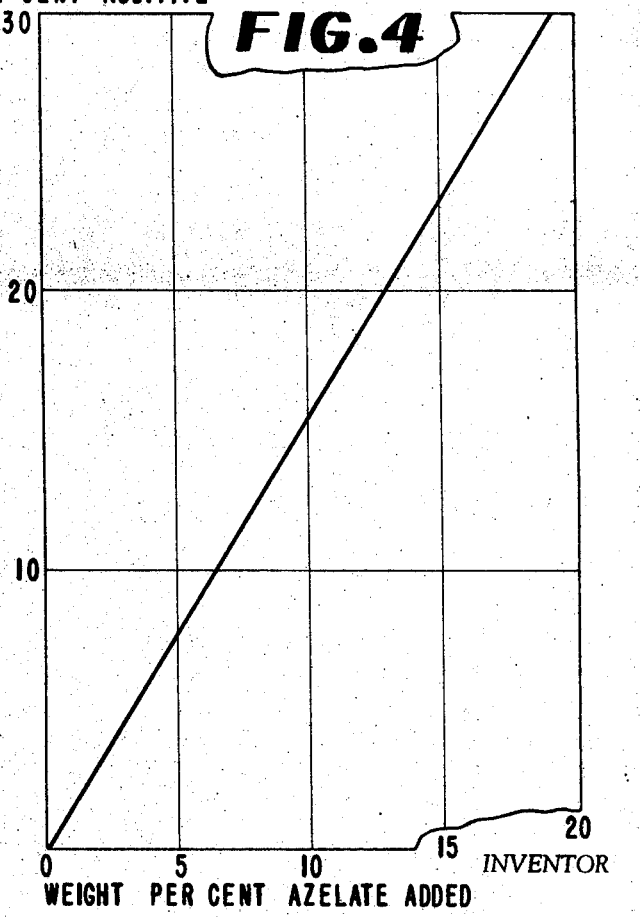
FIG. 4 graphically illustrates the depression of melting point of polyethylene terephthalate as a function of weight percent dihydroxyethyl azelate comonomer added.

If the melting point of the product is a criterion of the utility of the product, then the weight percent of dihydroxyethyl azelate copolymer to be added can be determined from FIGS. 2 and 4, which show the depression of the melting temperature respectively as a function of the mole percent and weight percent of dihydroxyethyl azelate added.

In practice, additives are introduced by weight, based on the polymer throughput in a continuous process. For example, with dihydroxyethyl terephthalate obtained by the glycolysis of scrap film, at 100 lbs. per hour of polymer output, 1 mole percent of dihydroxyethyl azelate is 1.44 lbs. per hr.

The completed copolyester can be cast into a film by conventional techniques. For example, the polyester can be immediately cast through a slit orifice directly onto a cooled quench drum, thereby eliminating the need for subsequent reheating of the copolyester before casting. After casting, the film can be molecularly oriented by uniaxial or biaxial stretching. In biaxially oriented films having a thickness of about 1 mil, an F–80 value of less than about 16,000 p.s.i. is generally desired. The F–80 value can be measured, for example, by the methods described in British Pat. 1,081,144, which is hereby incorporated by reference. Generally, the films produced by the process of the instant invention are oriented to a substantial degree by stretching at least 2.6 times in each of two mutually perpendicular directions. In film products containing less than about 15 mole percent azelate copolymer according to the instant invention and generally about from 2% to 10 mole percent, the above F–80 values are realized even after stretch orienting the cast film up to 3.5 times the original dimension in each of two mutually perpendicular directions.

The process of the instant invention is further illustrated by the following examples, in which parts and percentages are by weight unless otherwise indicated.

EXAMPLES 1–4

Dihydroxyethyl terephthalate (DHET) obtained from glycolysis of scrap film is co-polymerized in a tubular batch reactor with varying percentages of preformed dihydroxyethyl azelate (DHEA). The reaction mixtures are heated under vacuum to a temperature of about from 275° to 300° C. for several hours. The finished polymer is then quenched and the glass transition temperature and the melting point determined with a differential thermal analyzer. The four examples are summarized in the following Table I.

TABLE I

|  | Example | | | |
| --- | --- | --- | --- | --- |
|  | 1 | 2 | 3 | 4 |
| Mole percent DHEA | 5 | 10 | 15 | 20 |
| Mole percent DHET | 95 | 90 | 85 | 80 |
| Weight, DHEA | 7.1 | 14.0 | 20.9 | 27.8 |
| Weight, DHET | 122.9 | 116.0 | 109.2 | 102.2 |
| Time started heating | 9:00 | 9:00 | 9:05 | 9:05 |
| Time started vacuum | 10:15 | 10:15 | 10:15 | 10:15 |
| Pressure: | | | | |
| 1.5 mm. Hg | 10:30 | 10:30 | 10:30 | 10:30 |
| 1.0 mm. Hg | 10:45 | 10:45 | 10:45 | 10:45 |
| 0.7 mm. Hg | 12:10 | 12:10 | 12:10 | 12:10 |
| 0.6 mm. Hg | 14:20 | 14:20 | 14:20 | 14:20 |
| Polymer quenched | 16:05 | 16:00 | 15:50 | 15:55 |
| Polymerization time | [1]7, [2]25 | [1]7 | [1]6, [2]45 | [1]6, [2]50 |
| Melting point, ° C | 231 | 227 | 218 | 197 |

[1] Hours.
[2] Minutes.

Examples 5 and 6

Two batches of polyethylene terephthalate are prepared in a continuous process. Dihydroxyethyl terephthalate is produced by an ester interchange reaction between dimethyl terephthalate and ethylene glycol. After the formation of the dihydroxyethyl terephthalate, dihydroxyethyl azelate is added prior to polymerization so as to comprise 1.5 and 3 mole percent in Examples 5 and 6 respectively. After incorporation of the dihydroxyethyl azelate, the mixture is polymerized and the resulting copolyester extruded from a hopper having a slit orifice onto a cool quench drum. The cast films are then biaxially oriented by continuously feeding the film onto idler rolls where it is stretched longitudinally 2.8 times original dimension and then continuously fed onto a tenter frame where it is stretched about from 2.85 times in the transverse direction. The resulting films have a thickness of about 0.0005 inch, and the F–80 values are found to decrease with increasing concentrations of dihydroxyethyl azelate copolymer, as indicated in the following Table II.

TABLE II

|  | Example | |
|---|---|---|
|  | 5 | 6 |
| Mole percent, azelate | 1.5 | 3 |
| F-80, p.s.i. average: | | |
| LD | 15,100 | 12,600 |
| TD | 17,900 | 14,200 |

Example 7

A polyethylene terephthalate containing undetermined quantities of diethylene glycol and azelate is prepared in a continuous process from monomer obtained from the glycolysis of scrap polyethylene terephthalate film. The melting point of the resulting polymer is determined, and a quantity of dihydroxyethyl azelate is added in the process to increase the content of the azelate in the finished polymer 6 mole percent, and thereby decrease the melting point. A film is prepared from the polymer, and the film is stretched 2.88 times in the longitudinal direction and 2.85 times in the transverse direction to give an oriented film having a thickness of 0.5 mil. The film is found to have a melting point of 230° C. and a final F–80 value of 11,500 p.s.i. LD and 12,800 TD.

I claim:

1. A process for the control of the formability of polyethylene terephthalate copolymer prepared by condensation polymerization which comprises
   (a) preparing a mixture consisting essentially of dihydroxyethyl terephthalate and diethylene glycol,
   (b) determining the relative quantities of dihydroxyethyl terephthalate and diethylene glycol present in mixture (a), and
   (c) bringing into contact mixture (a) and a quantity of separately preformed dihydroxyethyl azelate sufficient, by reference to FIG. 3, to lower the glass transition temperature of the resulting copolyester by a given increment.

2. A process of claim 1 wherein components (a) and (c) are brought into contact at a temperature of about from 220° to 300° C.

3. A process of claim 1 wherein mixture (a) is the reaction product of dimethyl terephthalate and ethylene glycol.

4. A process of claim 3 wherein about from 0.5 to 45 mole percent of mixture (a) consists of diethylene glycol.

References Cited

UNITED STATES PATENTS 3,341,500  9/1967  Schwarz _____ 260—75
3,372,148  3/1968  Wiener _____ 260—75

FOREIGN PATENTS 6,504,590  10/1965  Netherlands.

OTHER REFERENCES

Edgar et al.: J. Chem. Soc. 1952, 2633–38.
Edgar: J. Chem. Soc. 1952, 2638–43.
Somers: Brit. Rayon and Silk J. 31, No. 369, 71–74 (1955).
Izard: J. Polym. Sci. 8, 503–18 (1952), pp. 508–09 supplied.

WILLIAM H. SHORT, Primary Examiner

M. GOLDSTEIN, Assistant Examiner

U.S. Cl. X.R.
264—28